United States Patent [19]

Dumas et al.

[11] 4,419,111
[45] Dec. 6, 1983

[54] DEVICE FOR ABSORBING MOISTURE IN A CLOSED SPACE

[75] Inventors: Jean A. Dumas, Rueil Malmaison; Hildebert Naudin, Saint-Cloud, both of France

[73] Assignee: Societe Anonyme Rubson S.A.F., Rueil-Malmaison, France

[21] Appl. No.: 292,135

[22] Filed: Aug. 11, 1981

[30] Foreign Application Priority Data

Sep. 30, 1980 [FR] France .................................. 8020910

[51] Int. Cl.³ .................................................. B01D 39/00
[52] U.S. Cl. .................................. 55/388; 248/441 B; 312/351
[58] Field of Search .................................. 55/387–389; 248/441 B, 205 R; 312/351

[56] References Cited

U.S. PATENT DOCUMENTS

| 2,341,893 | 2/1944 | Baker . |
| 2,624,420 | 1/1953 | Elegar . |
| 3,248,862 | 5/1966 | Lovercheck . |
| 4,319,679 | 3/1982 | Gustafsson .............................. 55/387 |

FOREIGN PATENT DOCUMENTS

| 2234029 | 1/1975 | France . |
| 1161772 | 8/1969 | United Kingdom . |

*Primary Examiner*—Bernard Nozick
*Attorney, Agent, or Firm*—Young & Thompson

[57] ABSTRACT

The present invention relates to a device for absorbing moisture in a closed space, adapted for receiving and supporting a perforated bag (2) of oblong shape containing the hydrophilic product. The device according to the invention comprises a tank (1) and an easel (4) disposed in the tank and capable of supporting the perforated sachet (2) containing the hydrophilic product substantially over the upper edge of the tank. The device improves the access of the outer air to the perforated sachet, the liquefied product flowing into the tank (1).

3 Claims, 1 Drawing Figure

U.S. Patent   Dec. 6, 1983   4,419,111
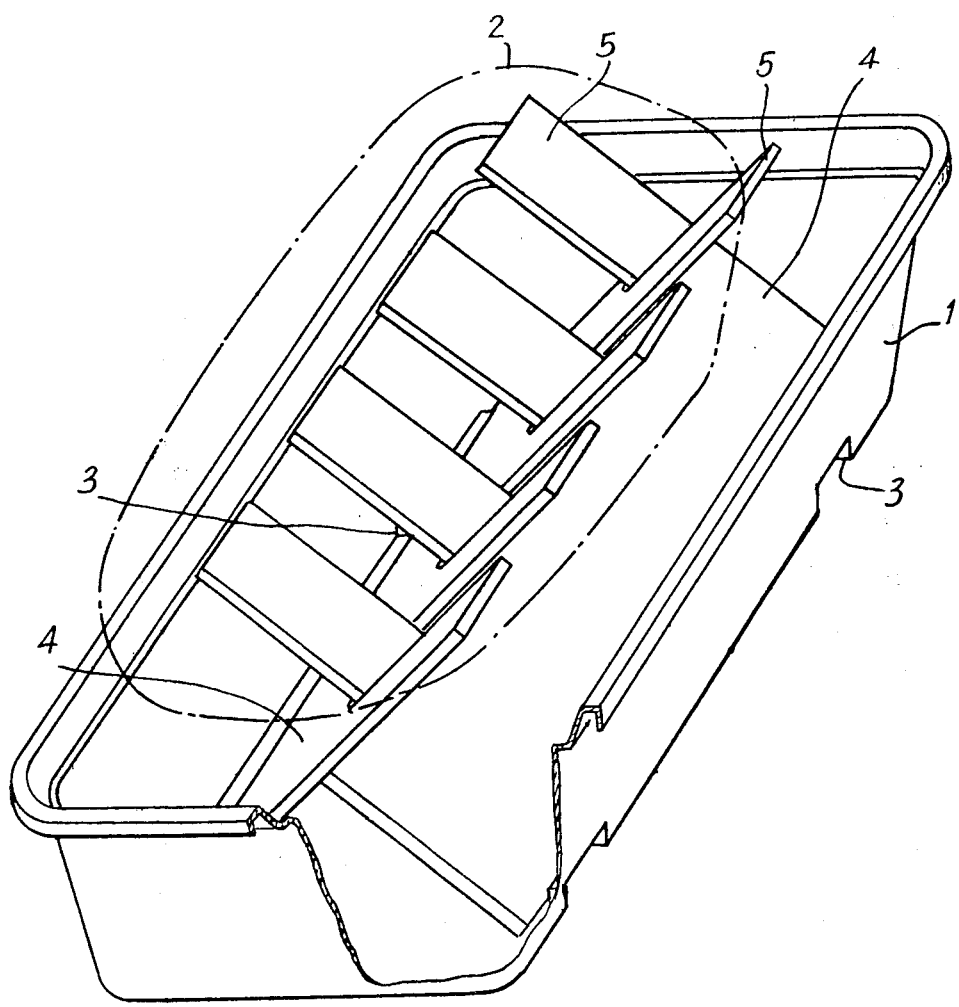

DEVICE FOR ABSORBING MOISTURE IN A CLOSED SPACE

Products are known which present themselves in the solid shape of crystals or lumps, for example calcium chloride, which absorb the air moisture and liquefy. The liquefied product should not sojourn on the surface of the crystals or lumps since it isolates them from the air to be dehydrated.

Therefore, the practical use of such products requires a device adapted for supporting the product while authorizing the free access of the ambient atmosphere to the product mass and the outflow of the liquefied salt.

French patent application No. 2.234.029 discloses devices attempting to meet such requirements, but the various devices proposed are based on a large size container in which is introduced a perforated container in which is the product or in which is suspended a perforated bag filled with the product. In such devices, the natural air circulation about the product mass is quite unsatisfactory, the product mass being surrounded by the container wall and said container must have quite a large volume so that the liquid level does not reach the container or the sachet. Therefore, the device is in efficient and bulky.

The object of the present invention is to provide a device of such a type, which is simple, of low cost and adapted for being packed under a small volume with the product itself, said product being normally packed in a perforated bag of oblong shape, the bag being in turn enclosed inside a tightly sealed bag for storage and transportation. The invention has also for object to support said bag so that it can be disengaged from the receptacle provided for collecting the liquefied product. Moreover, the liquefied product exhibits a rather large surface tension and can exhibit some corrosive power. It is therefore important that it cannot flow by capillarity outside the container, which would be likely to happen should the perforated bag be placed on a grid bearing against the edges of the container, the liquefied product being likely to spread along the bars of the grid and flow outside the container.

The device for absorbing moisture and adapted for receiving the oblong perforated bag containing the hydrophilic product comprises a tank and an easel adaptable into said tank and capable of supporting the perforated sachet containing the hydrophilic product substantially above the upper edge of the tank.

According to a preferential embodiment, the easel is made of two comb-shaped plates which can interfinger for forming an easel, the longitudinal sides of the bases of the combs being engageable into the tank, bearing on the bottom and abutting against two longitudinal elements rigidly connected to the bottom of the tank, generally the two opposite side walls, for mechanically limiting the opening of the easel between the teeth of which is placed the bag of product.

The easel shape with alternately disposed teeth on either side of the bag provides a good support for the perforated bag, an easy access of the ambient air to the perforations of the bag by flowing above the edge of the tank and a good outflow of the liquefied salt in the tank which, apart from its role of collecting tank, forms a mechanical limiting device for the spreading out of the easel. Moreover, the liquid which is flowing on the surfaces of the easel cannot diffuse outside this tank.

Preferably, the plates forming the easel have sizes such that they adapt themselves to the disassembled state in the upper portion of the tank which has a volume sufficient for receiving the bag of hydrophilous product.

The present invention will be described hereafter in more detail with reference to the accompanying drawing representing a perspective view, partially cut out, of the device, the bag of product being represented by a chain-dot line.

The device comprises a rectangular tank 1, for example made of a rigid plastics sheet obtained by vacuum forming or the like. The practical dimensions of said tank are of about 35 cm in length, 20 cm in width and 8 cm in depth, representing a volume of 4200 cm$^3$ for a load 2 of calcium chloride in a dry state of 1 kg. The tank is formed preferably along the longitudinal edges with protrusions 3 adapted for providing abutments limiting the opening of the easel.

The easel is composed of two plates 4 made of a sufficiently rigid material, or made rigid by ribs. Said plates which, with the hereabove tank, have for example a length of 30 cm and a width of the order of 15 cm, are cut out along one of their edges in order to form the teeth 5 the width of which is slightly less than the width of a cut out and the length of which is of the order of 7 cm.

The device is mounted as appears clearly from the drawing by assembling the two plates 4 through the engagement of the teeth of one of them into the cut outs of the other and placing the easel inside the tank 1 with the lower edge of the plates bearing against the bottom and abutting against the protrusions 3. The perforated bag 2 containing the calcium chloride or the like in lump form is placed on the teeth of the easel.

The hereabove embodiment which is described by way of example can receive many modifications without departing from the scope of the appended claims.

We claim:

1. A device for removing moisture in a closed space comprising:
    a perforated sachet of oblong shape containing hydrophilic sorbent in solid form which liquefies upon absorption of moisture;
    an upwardly open tank adapted to receive the liquefied hydrophilic sorbent
    and a support for said perforated sachet supporting said sachet above said tank, said support being in the form of an easel disposed in said tank and having upwardly and outwardly opposed extending teeth, said teeth supporting the perforated oblong sachet between said teeth at a level above the upper edge of the tank.

2. A device for removing moisture in a closed space, according to claim 1, wherein the easel comprises two comb-shaped plates which interfinger to form the easel, the longitudinal sides of the bases of the combs bearing against the bottom of the tank and abutting against two longitudinal elements rigidly connected to the bottom of the tank for mechanically limiting the opening of the easel between the teeth between which is disposed said sachet.

3. A device for removing moisture in a closed space, according to claim 2, wherein said plates have dimensions such that they adapt themselves to the disassembled state in the upper portion of the tank which has a volume making it capable of receiving the perforated sachet of oblong shape containing the hydrophilic sorbent and the volume of the liquefied hydrophilic sorbent.

* * * * *